United States Patent
Burrell et al.

(10) Patent No.: US 8,935,089 B2
(45) Date of Patent: Jan. 13, 2015

(54) MOBILE MAPPING IN UNDERGROUND OR SHIELDED ENVIRONMENTS

(71) Applicant: Research In Motion Limited, Waterloo (CA)

(72) Inventors: Douglas James Arthur Burrell, Waterloo (CA); Robert Michael Philip Gondosch, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 13 days.

(21) Appl. No.: 13/891,510

(22) Filed: May 10, 2013

(65) Prior Publication Data

US 2014/0336920 A1   Nov. 13, 2014

(51) Int. Cl.
*G01S 13/87* (2006.01)
*G01C 21/20* (2006.01)
*G01C 21/36* (2006.01)
*H04B 5/00* (2006.01)

(52) U.S. Cl.
CPC .............. *G01C 21/206* (2013.01); *H04B 5/00* (2013.01)
USPC ........... 701/409; 701/300; 701/468; 701/434; 701/491; 701/517

(58) Field of Classification Search
None
See application file for complete search history.

(56) References Cited

U.S. PATENT DOCUMENTS

| | | | |
|---|---|---|---|
| 7,772,976 B2 * | 8/2010 | Christopher | 340/572.1 |
| 7,817,990 B2 * | 10/2010 | Pamminger et al. | 455/414.3 |
| 8,624,725 B1 * | 1/2014 | MacGregor | 340/539.13 |
| 2003/0080901 A1 | 5/2003 | Piotrowski | |
| 2008/0167806 A1 * | 7/2008 | Wheeler et al. | 701/208 |
| 2010/0073201 A1 * | 3/2010 | Holcomb et al. | 340/990 |
| 2012/0029817 A1 | 2/2012 | Khorashadi et al. | |
| 2012/0094597 A1 * | 4/2012 | Tysowski | 455/41.1 |
| 2012/0176255 A1 * | 7/2012 | Choi et al. | 340/989 |
| 2013/0103200 A1 | 4/2013 | Tucker et al. | |
| 2013/0171932 A1 * | 7/2013 | Park et al. | 455/41.1 |

FOREIGN PATENT DOCUMENTS

EP    2253937 A1    11/2010
FR    2973519 A1    10/2012

OTHER PUBLICATIONS

European Search Report from corresponding EP application 13167248.7 dated Oct. 24, 2013.

* cited by examiner

*Primary Examiner* — Michael J Zanelli
(74) *Attorney, Agent, or Firm* — Gowling Lafleur Henderson LLP

(57) ABSTRACT

A method for providing location information such as a map in an underground or shielded environment entails storing first near-field communication (NFC) data obtained by reading a first NFC tag at a first location, reading a second NFC tag at a second location, obtaining map data for an area encompassing the first and second locations, and displaying a map showing the first location and the second location.

14 Claims, 10 Drawing Sheets

MOBILE MAPPING IN UNDERGROUND OR SHIELDED ENVIRONMENTS

CROSS-REFERENCE TO RELATED APPLICATIONS

This is the first application filed for the present technology.

TECHNICAL FIELD

The present technology relates generally to mobile devices and, in particular, to mapping services for mobile devices.

BACKGROUND

Mobile devices or wireless communications devices use global navigation satellite systems (GNSS) like Global Positioning System (GPS) to provide precision mapping of a current location of the device. In underground or other shielded environments where the GNSS signals cannot be received, these mapping systems cannot be used. For example, when a mobile user has parked a car in an underground garage, it would be useful to be able to provide a map of the underground garage to direct the user back to this car. There is accordingly a need for a solution to this technical problem.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
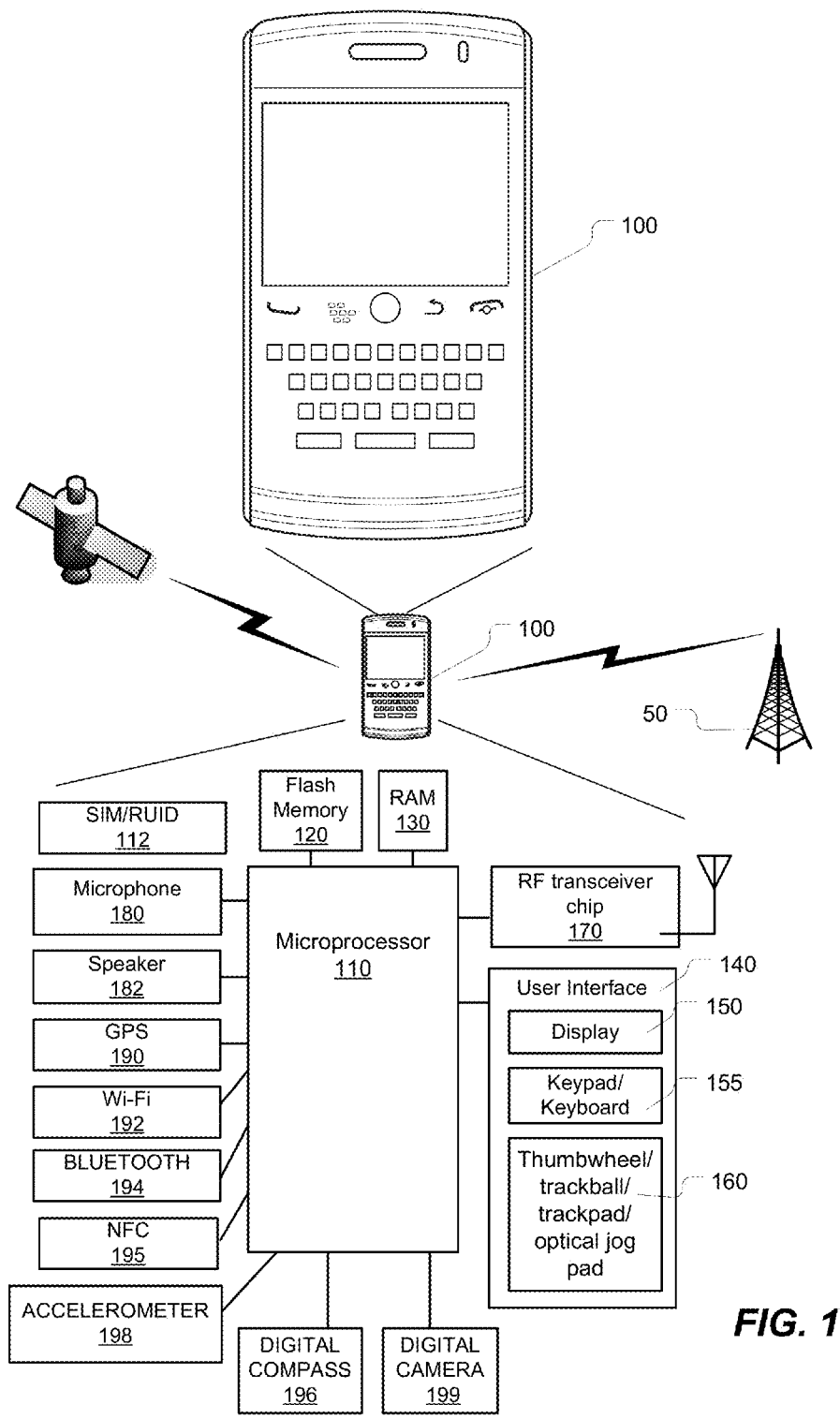
FIG. 1 is a depiction of a mobile device on which the present technology may be implemented, the depiction including a schematic depiction of some components of the mobile device.

The present technology enables a mobile device to display a map of an underground or shielded environment, like an underground parking garage, where GNSS (e.g. GPS) signals cannot be received with sufficient strength to obtain a position fix. Embodiments of the present technology utilize fixed-location tags (e.g. NFC tags, RFID tags, barcodes, QR codes, etc.) that are affixed to fixed locations within the underground or shielded environment. The mobile device includes a tag reader (e.g. NFC reader, RFID reader, camera and image-recognition software for reading barcodes or QR codes). The tag reader is capable of reading the fixed-location tags. The mobile device accesses a short-range wireless router (e.g. a Wi-Fi router) that is disposed within the underground or shielded environment that routes the mobile device's map data request to a map data server that serves map data of the underground or shielded environment to the mobile device. The mobile device can then display a map of the underground or shielded environment on the mobile device. The map shows the location of the fixed-location tag that was most recently read. In other embodiments, the map shows the stored location of a previously read fixed-location tag. For example, this stored location may represent a location where the user of the mobile device parked his or her vehicle in an underground parking garage.

Accordingly, an inventive aspect of the present technology is a method, performed by a mobile device, for providing location information in an underground or shielded environment. The method entails storing first near-field communication (NFC) data obtained by reading a first NFC tag at a first location (e.g. a fixed location such as a pillar, column, wall, etc.), reading a second NFC tag at a second location (e.g. another fixed location such as a pillar, column, wall, etc.), obtaining map data for an area encompassing the first and second locations, and displaying a map showing the first location and the second location.

Another inventive aspect of the present technology is a computer-readable medium comprising instructions in code which when loaded into a memory and executed by a processor of a mobile device cause the mobile device to computer-readable medium comprising instructions in code which when loaded into a memory and executed by a processor of a mobile device cause the mobile device to store first near-field communication (NFC) data obtained by reading a first NFC tag at a first location, read a second NFC tag at a second location, obtain map data for an area encompassing the first and second locations, and display a map showing the first location and the second location.

Another inventive aspect of the present technology is a mobile device having a near-field communication (NFC) reader for reading an NFC tag affixed to a location, a processor for determining NFC tag data from the NFC tag, a wireless transceiver for transmitting the NFC tag data to a server and for receiving map data for an area corresponding to the location, and a display for displaying a map of the location.

The details and particulars of these aspects of the technology will now be described below, by way of example, with reference to the drawings.

FIG. 1 is a depiction of a wireless communications device as one example of a mobile device that may be used to implement this novel technology. Examples of a mobile device include cell phones, smart phones, mobile phones, portable digital assistants, tablets, notebooks, laptops, palmtops, or any other such portable or handheld electronic communications devices. This may also include any wearable wireless devices like wireless-enabled goggles, glasses, watches, etc.

As shown by way of example in FIG. 1, the mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications and, in this instance, for receiving user input to set up a call to another device. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the mobile device 100 may include a wireless transceiver 170 for communicating with other devices. The transceiver 170 may be a radiofrequency (RF) transceiver for wirelessly communicating with one or more base stations 50 over a cellular wireless network using cellular communication protocols and standards for both voice calls and packet data transfer such as GSM, CDMA, GPRS, EDGE, UMTS, LTE, etc. Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may optionally include one or more ports or sockets for wired connections, e.g. USB, HDMI, FireWire (IEEE 1394), etc. or for receiving non-volatile memory cards, e.g. SD (Secure Digital) card, miniSD card or microSD card.

For voice calls, the mobile device 100 includes a microphone 180, a speaker 182 and/or an earphone jack. Optionally, the device may include a speech-recognition subsystem for transforming voice input in the form of sound waves into an electrical signal. The electrical signal is then processed by a speech-recognition module (digital signal processor) to determine voice commands from the voice input.

Optionally, the mobile device 100 includes a positioning subsystem such as a Global Positioning System (GPS) receiver 190 (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS (or other GNSS) in a hybrid positioning system.

The mobile device 100 may include a Wi-Fi™ transceiver 192 or any other equivalent short-range wireless transceiver for communicating with a Wi-Fi router or hotspot. For example, the mobile device 100 may optionally include a transceiver for WiMax™ (IEEE 802.16), a transceiver for ZigBee® (IEEE 802.15.4-2003 or other wireless personal area networks), an infrared transceiver or an ultra-wideband transceiver.

The mobile device 100 may include a Bluetooth® transceiver 194 for pairing with another Bluetooth® device or transceiver. Bluetooth® may be used to access map data from a local data store.

The mobile device 100 may include a near-field communications (NFC) chip 195. The NFC chip may be part of an NFC reader and/or operate in conjunction with NFC processing software on the device capable of processing data read from an NFC tag. NFC is a short-range wireless technology that operates typically over a distance of 10 cm or less. Operating at a frequency of 13.56 MHz, NFC transmits at data rates of 106 kbit/s to 424 kbit/s. The NFC reader (initiator) irradiates a tag (passive target that does not require batteries) by actively generating an RF field that powers the tag. The NFC tags may take the form of stickers that are affixed to fixed locations such as pillars, columns, walls, doors, or other surfaces inside a garage or other shielded environment. These NFC tags act as location identifiers (or "beacons" or "markers").

Optionally, the mobile device may include other sensors like a digital compass 196 and/or a tilt sensor or accelerometer 198.

Optionally, the mobile device includes a digital camera 199 which may be a forward-facing camera or a rearward-facing camera. In another embodiment, the mobile device may include two cameras (both a forward-facing camera and a rearward-facing camera). The mobile device may store and execute image-processing software that is capable of recognizing a barcode or a QR code. In another embodiment, the image-processing software can recognize signage in a photographic image taken by the camera. For example, in some underground parking garages, there are signs affixed to columns, pillars, walls, etc. to designate a certain area of the parking garage. For example, it is common practice to label columns, pillars and the like with labels such as A1, A2, A3, B1, B2, B3, etc. to designate different areas of the parking garage to enable visitors to remember where they parked their vehicles. The camera may take a photo of a sign, e.g. A3. Image recognition techniques may be used to identify the label "A3" from the photo, which may then be used to fetch the appropriate map data and to plot the location of A3 on the map.

As noted above, one of the main problems that arises in underground parking garages is that the user may not remember the area label (e.g. K2) or, even if the user remembers the area label, the user may be unfamiliar with the layout of the garage and thus be unable to readily locate the desired area (e.g. K2) in the garage.

The present technology solves this problem by enabling the mobile device to obtain map data for the garage and to display the map of the garage for the user showing the location where the user's car was parked (assuming a location reading was obtained at a location near where the car was parked) and also showing where the user is currently located (i.e. where the user is currently located at the moment the user has read another fixed-location tag in the garage). As will be appreciated, the precision of the locations depends on how many fixed-location tags are distributed throughout the garage. In one embodiment, tags are affixed to columns or pillars for each sector of the garage. In another embodiment, tags are affixed to the wall(s) at each parking space for greater precision.

The mobile device can thus provide mapping for underground or shielded environments where GNSS (GPS) signals cannot penetrate (or where such signals are not sufficiently strong to obtain a position fix). An underground environment may be an underground parking garage, a subway system, a pedestrian tunnel system, basement complex of a building, a mine, or any other physical environment where GNSS-based mapping is not possible. A shielded environment is any above-ground place where GNSS signals cannot be received because of RF-shielding of GNSS signals or because of a canyon effect (e.g. outside on a street between tall buildings). For example, being on the $5^{th}$ floor of a 30-floor building may result in no GNSS signal being receivable by the GNSS receiver in the mobile device. As such, this would be considered a shielded environment. A map for the $5^{th}$ floor may be obtained using this technology.

When the mobile device returns to the surface or returns back to an area where the GNSS (GPS) signals are receivable with sufficient strength to obtain a position fix, standard GNSS mapping/navigation may be performed by the mobile device. The mobile device may thus be configured to switch between GNSS mapping/navigation mode and underground/ shielded mode. This may be done in response to detecting the loss of a GNSS signal or conversely the return of a GNSS signal. When the GNSS signal is lost, the device may have entered a tunnel, urban canyon or parking garage. The device may correlate the last GNSS position fix with the location of a known underground parking garage. This may enable the device to switch to underground mapping mode.

In another embodiment, the mobile device may wait until both the GNSS signal is lost and the device has stopped moving (as detected by an accelerometer in the mobile device). In this embodiment, the processor of the mobile device is configured to detect that a vehicle in which the mobile device has been travelling has been parked by monitoring accelerometer data of an accelerometer of the mobile device. In this embodiment, the processor may be further configured to generate a prompt to remind a user to read a nearby NFC tag to store the location of the vehicle. This prompt may be a visual display of a message or notification and/or it may be an audible alert, chime, or verbal message. Upon receipt of this reminder, the user finds the closest fixed-location tag near where the car is parked and then reads this tag with the mobile device. The mobile device then stores this location as the location of the parked vehicle. As will be appreciated, the location may be near or proximate the location of the parked vehicle if the tags are only disposed on nearby columns or pillars (and not at each individual parking place).

In some circumstances, the mobile device will enter a hitherto unknown parking garage. In that case, the processor of the mobile device may be configured to automatically store GNSS (GPS) coordinates of an underground parking garage or other underground or shielded environment when the processor detects that the mobile device has emerged from the underground or shielded environment (because a GNSS signal is being received). The processor of the mobile device may be configured to obtain a GNSS (GPS) position fix to store the location of the garage. The mobile device can thus remember the location of this garage. If the device approaches the garage in the future, the device can switch immediately to underground mapping mode and/or retrieve the map of the garage. In other words, the processor is configured to automatically switch from a street map view to an underground garage map view when detecting that the mobile device has re-entered the garage and has lost the GPS position fix. In another implementation, the processor is configured to predict entry into an underground garage, and to pre-emptively download a map of the underground garage. Prediction may be based on a direction of travel, time, location, calendar entries, and other such factors. For example, the device may predict that the user is returning to a hotel parking garage at the end of a day of sightseeing in a foreign city. The map of the garage may be retrieved to permit the user to view a layout of the garage. As such, the mobile device may store a plurality of garages that it has visited, e.g. airport garages, hotel garages, work-related garages, friends' garages, shopping center garages, etc.

Stored location data representing the location of a car that the user has parked may be manually deleted or automatically deleted. In a manual deletion, the user of the mobile device provides user input (a command) to cause the device to erase the location from its memory (or at least to mark the location as being no longer the active location). In an automatic deletion, the mobile device detects that the user is back in his car and has departed the garage in his car. This may be accomplished by detecting any data-pairing event between the car and the mobile device to signify that the mobile device is back at the car. For example, some cars have Bluetooth® chips whereas other cars may have NFC or RFID tags. Any of these technologies may be used to pair the car to the mobile device to signify that the car and mobile device have been reunited. Any such pairing event between the device and the car may thus be used to signify that the device has returned to the car.

Figure 2:
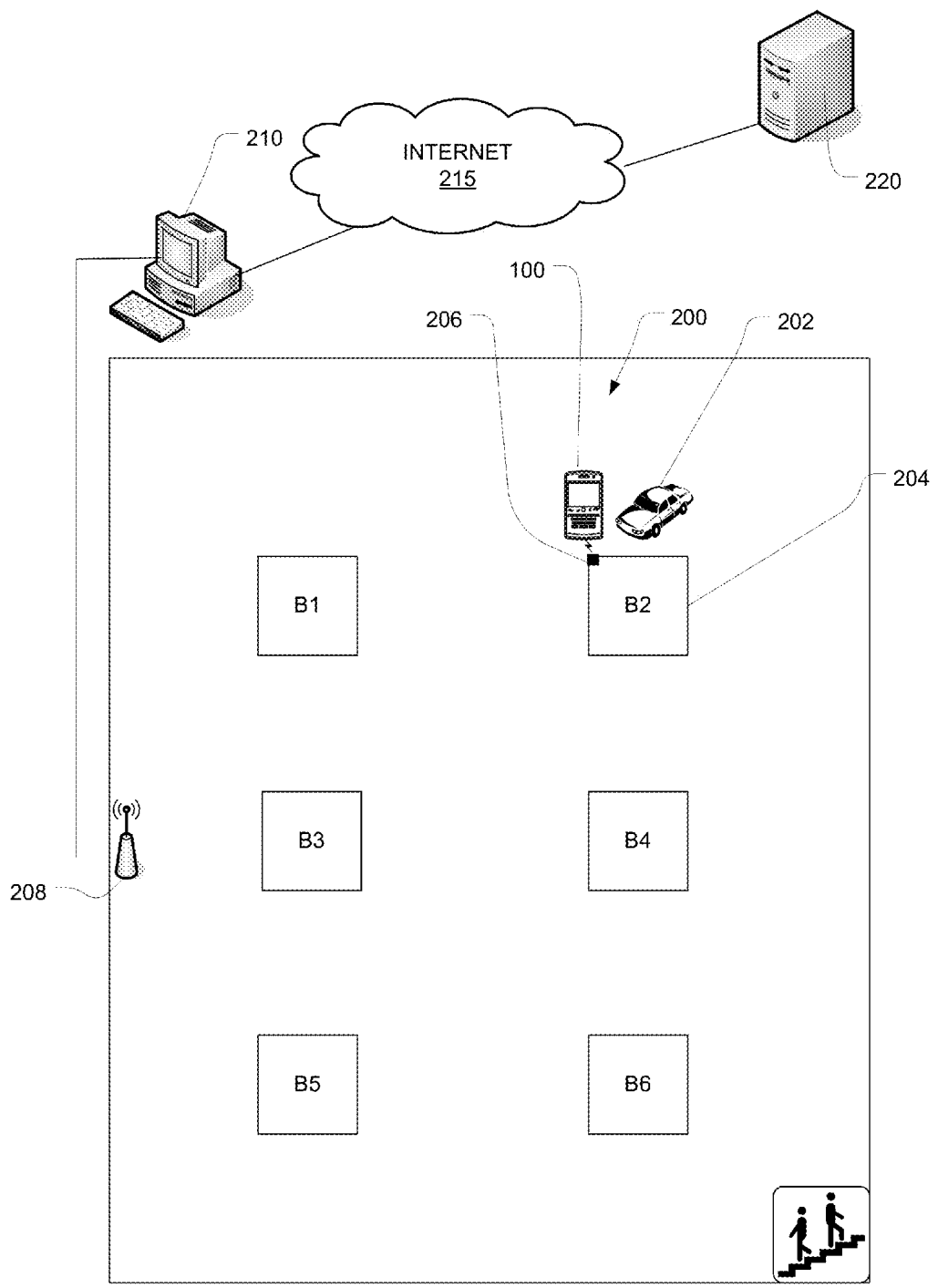
FIG. 2 depicts a system in accordance with one implementation of the present technology in which a mobile device reads a first NFC tag at a location near where a vehicle is parked in an underground parking garage.

FIG. 2 depicts a system in accordance with one implementation of the present technology in which a mobile device 100 reads a first NFC tag 206 disposed on a pillar/column 204 at a location (in parking sector B2) near where a vehicle 202 is parked in an underground parking garage 200. The mobile device 100 stores the data from the first NFC tag 206.

Figure 3:
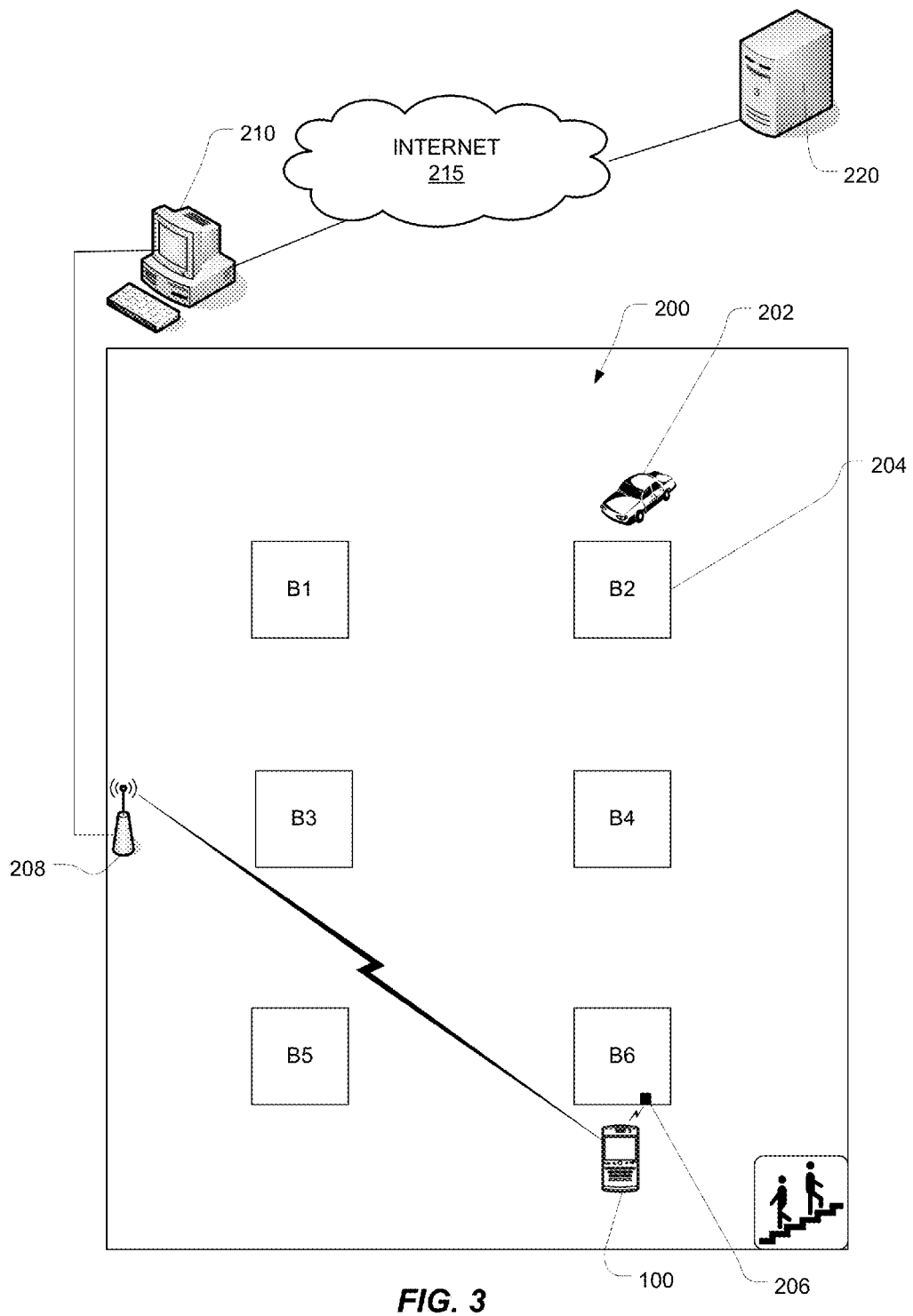
FIG. 3 depicts the system of FIG. 2 in which the mobile device, having returned to the garage, reads a second NFC tag and obtains a map of the garage by connecting to map server via a local Wi-Fi router.

FIG. 3 depicts the system of FIG. 2 in which the mobile device 100, having returned to the garage 200, reads a second NFC tag 206 (at a different location in the garage, e.g. at a pillar in sector B6) and obtains a map of the garage 200 by connecting to a map server 220 via a local Wi-Fi™ router 208. As shown in FIG. 3, the mobile device 100 communicates with the Wi-Fi™ router 208 using login credentials obtained from the NFC tag(s). Once connected to the router 208, the mobile device connects to a local computer 210 which is connected by a modem to the map server via the Internet 215. Alternatively, the map data may be locally stored in the local computer 210 (which may thus function as a local map server). The map server and/or local computer stores map data that includes the layout or floor plan of the garage, floor, level or other shielded environment. The locations of all NFC tags are stored in the map server or local computer. The locations of the NFC tags are fixed locations within the garage or shielded environment. However, it is to be understood that the NFC tags may be physically relocated (by detaching them from their respective pillars, walls, or other surfaces and reattaching them to new pillars, walls or surfaces). When NFC tags are relocated, their location data must be updated in the map server or local computer.

Figure 4:
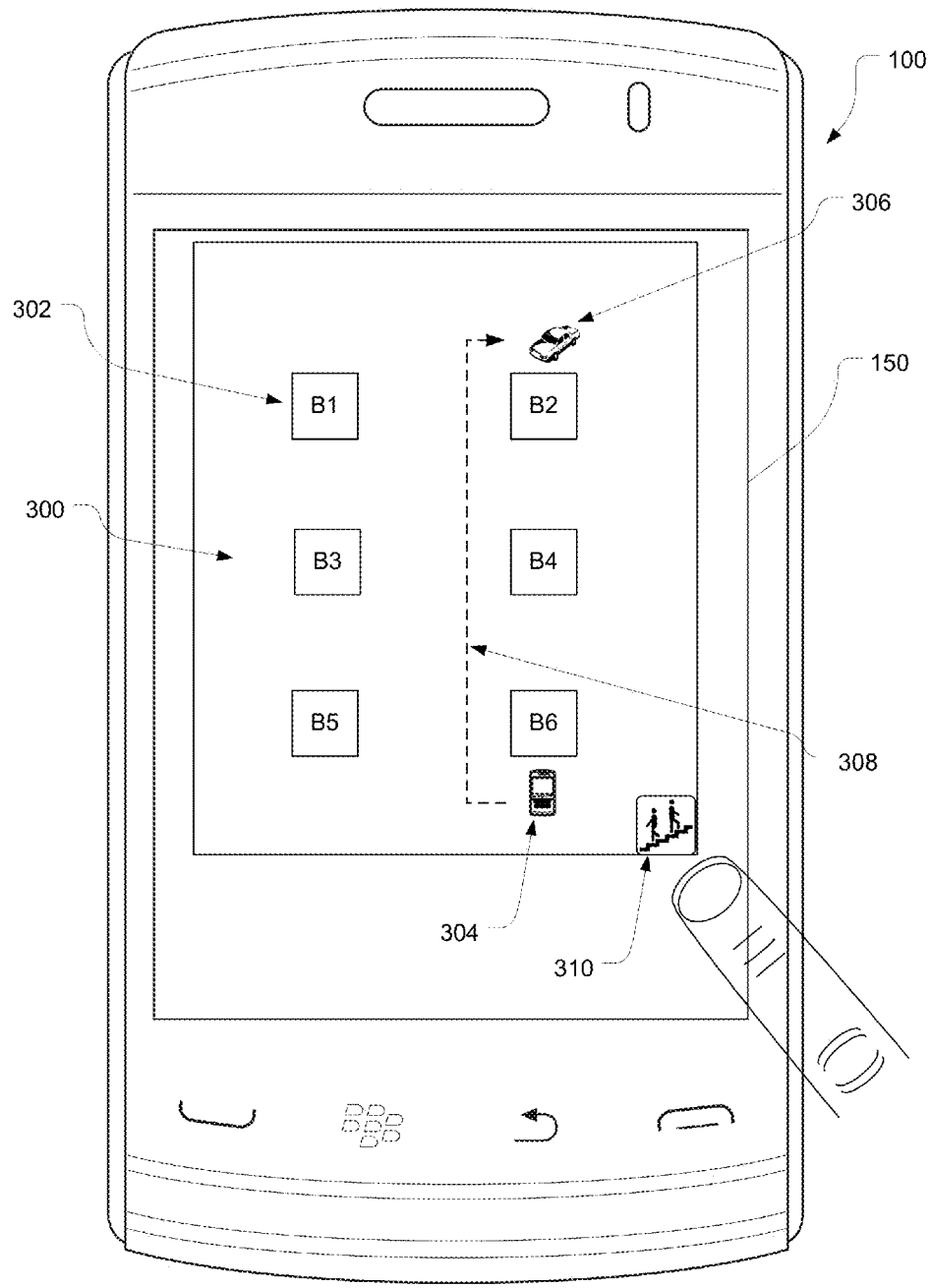
FIG. 4 depicts a mobile device displaying a map of the underground parking garage showing a route from the second NFC tag to the first NFC tag.

FIG. 4 depicts a mobile device 100 displaying (on a display screen 150) a map 300 of the underground parking garage showing various pillars (B1-B6) 302 and a route 308 from the second NFC tag to the first NFC tag. The route thus directs the user from the current location 304 of the mobile device 100 (at or near pillar B6) to the location of the parked vehicle 306 (at or near pillar B2). The map 300 may also present other features of the parking garage such as, for example, an exit, entrance, stairwell, elevator, pay station, etc. In this particular example, the stairwell icon 310 denotes the location of the stairwell.

Figure 5:
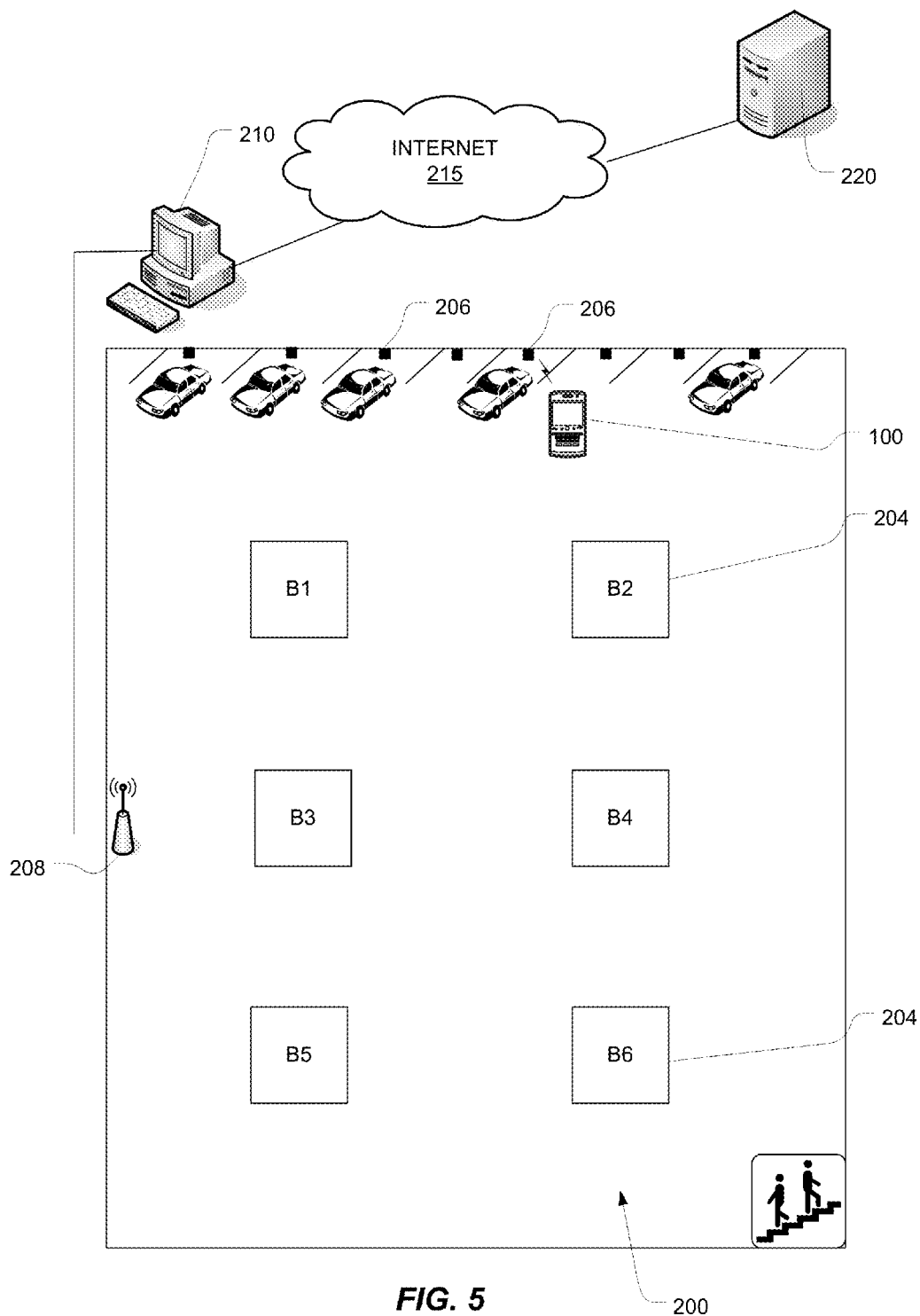
FIG. 5 depicts a system in accordance with another embodiment in which the underground parking garage has NFC tags disposed on walls at each parking space in the garage.

FIG. 5 depicts a system in accordance with another embodiment in which the underground parking garage 200 has NFC tags 206 disposed on walls at each parking space in the garage. In this illustrated embodiment, the NFC tags are disposed at each parking space for greater precision rather than placing the NFC tags on each sector column or pillar 204 which only indicates in which sectors (B1-B6) the device and vehicle are situated (although tags may be disposed both at individual parking spaces and on columns in yet another embodiment). The mobile device 100 is thus used to read the NFC tag 206 at the user's own parking space. Even though the NFC tags are disposed differently, the system is otherwise identical in that it includes a wireless (Wi-Fi™) router 208 and computer 210 for connecting via the Internet 215 to the map server 220.

Figure 6:
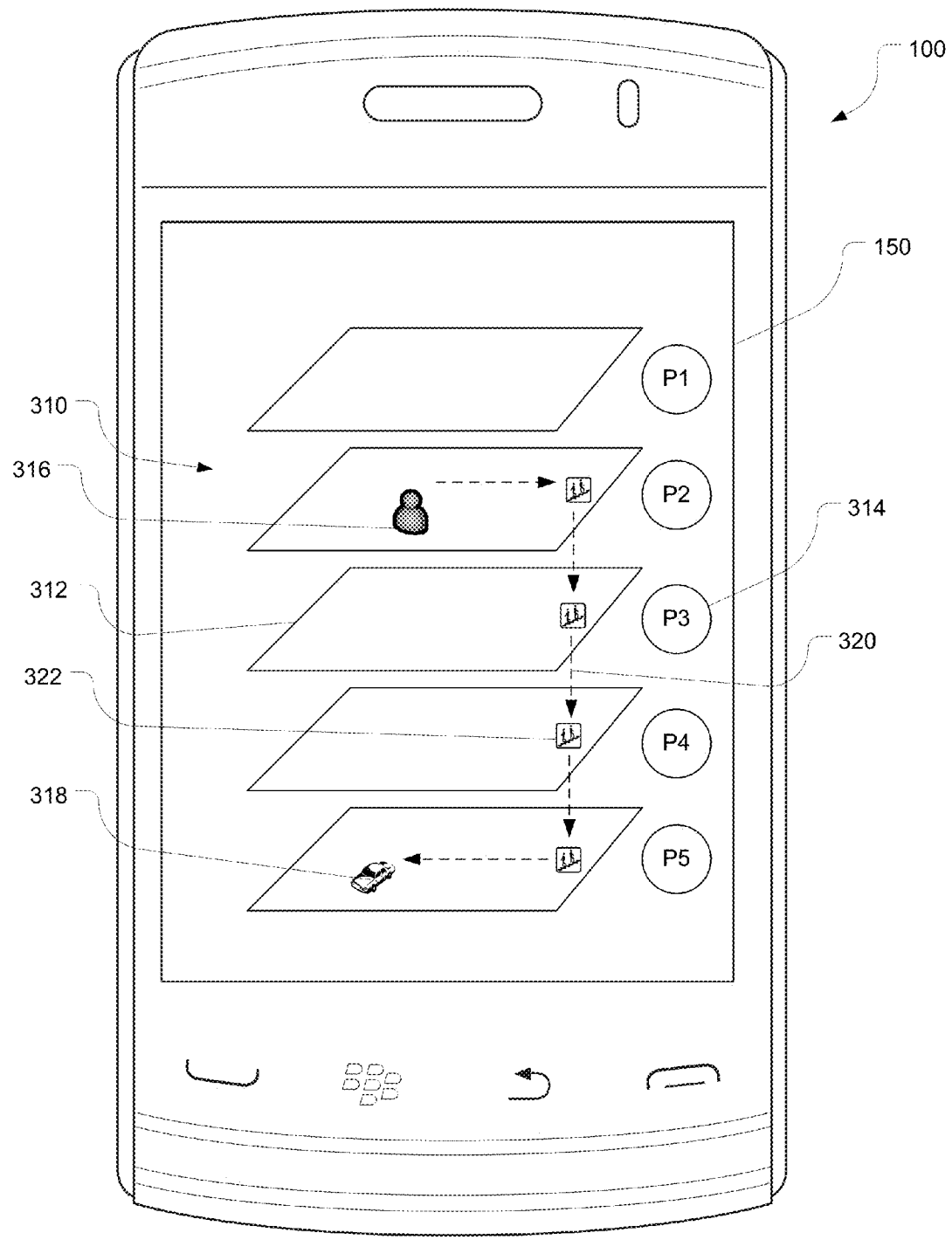
FIG. 6 depicts a mobile device displaying a multi-floor map of an underground parking garage in accordance with another embodiment.

FIG. 6 depicts a mobile device 100 displaying (on display screen 150) a multi-floor map 310 of an underground parking garage in accordance with another embodiment. In this further embodiment, the multi-floor (multi-level) parking garage is represented in a three-dimensional, isometric or perspective view showing each of the levels or floors 312. In this example, there are five levels (floors), namely P1-P5. These levels/floors 312 may be labelled or denoted as such by floor/level labels 314 (e.g. "P1", "P2", "P3", "P4" and "P5"). A graphical current location indicator (or user icon) 316 is displayed on the floor/level where the user is currently located (as determined by the user reading an NFC tag with his device). The location of the user's vehicle is displayed using a vehicle icon 318 at the location where a previous NFC reading was obtained immediately after parking the vehicle. The route 320 may also be displayed on the map 310. The map may also present stairwell icons 322 (or elevator icons or any other icons or symbols to help the user navigate from his current position to the parked vehicle. The map may be automatically zoomed or resized to accommodate both the current location and the vehicle's location. The map can also be collapsed from a multi-floor map view to a single floor view when the device is situated on, or moves to, the same floor where the vehicle is parked. The map view may include interface elements for zooming, panning, or rotating the map.

Figure 7:
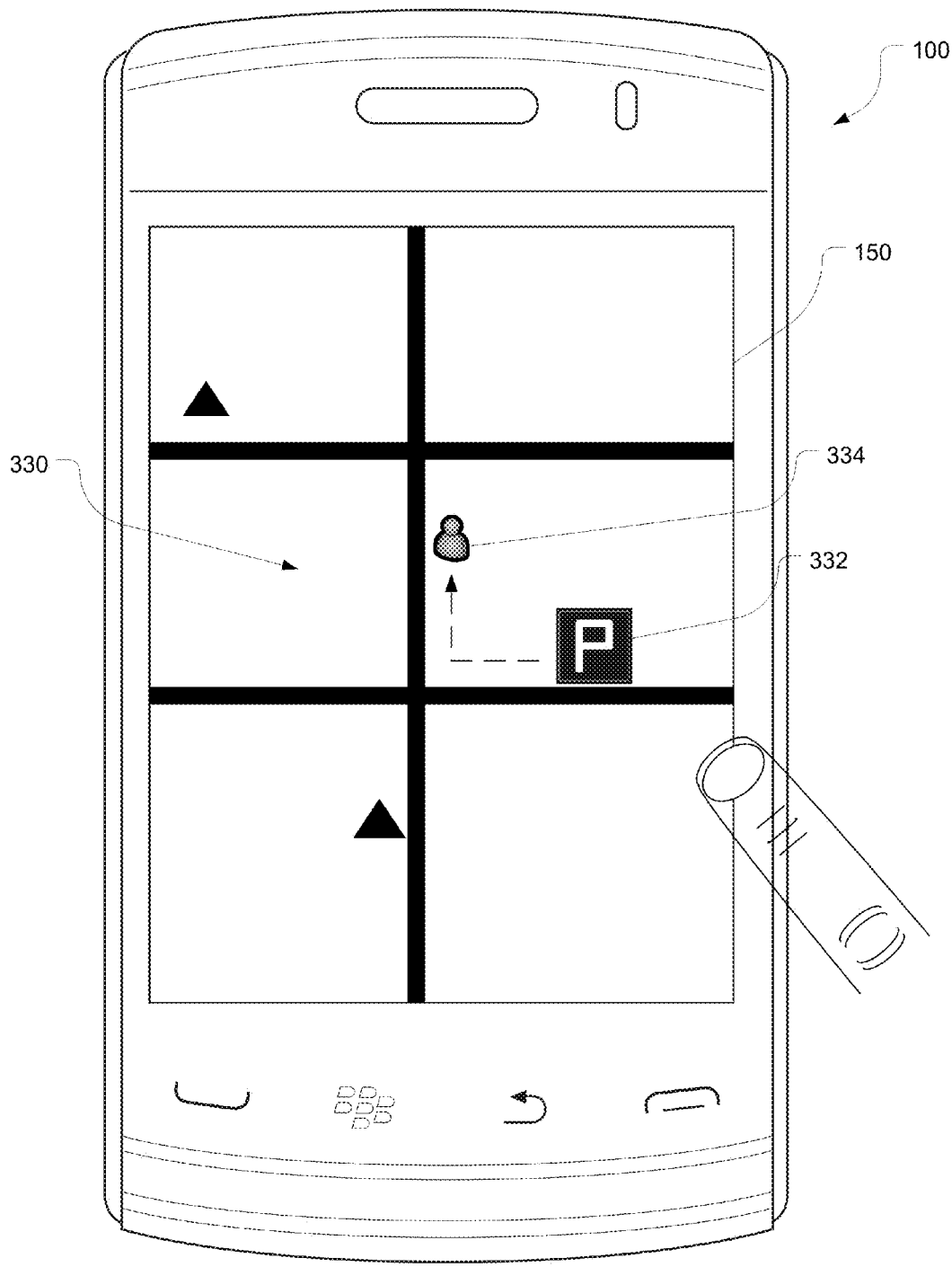
FIG. 7 depicts a mobile device displaying a street map on which is superimposed a user-selectable garage icon of the underground parking garage from which the mobile device has emerged.

FIG. 7 depicts a mobile device 100 displaying a street map 330 on which is superimposed a user-selectable garage icon 332 of the underground parking garage from which the mobile device has emerged. The map further displays a user icon (or graphical current position indicator) 334 representing the current position of the mobile device 100. The garage icon 334 may be a user-selectable interface element (e.g. a touch-sensitive button) that responds to user input from the user of the mobile device to display a map of the underground parking garage.

Figure 8:
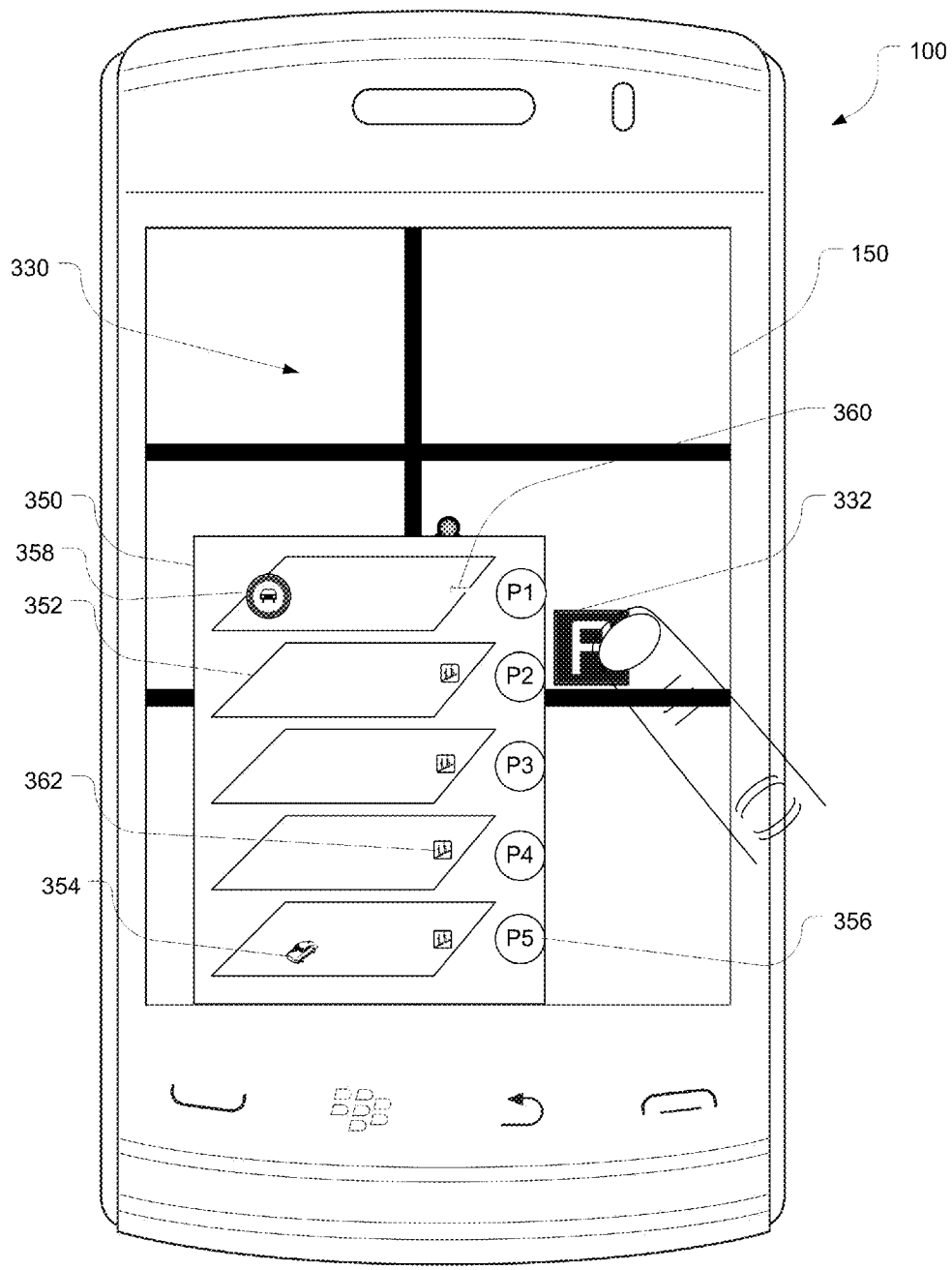
FIG. 8 depicts a mobile device displaying a multi-floor map in a window superimposed on the street map in accordance with another embodiment.

FIG. 8 depicts a mobile device 100 displaying a multi-floor map 350 in a window superimposed on the street map 330 in accordance with another embodiment. In this embodiment, the multi-floor map 350 shows each of the floors (levels) 352 in a perspective or isometric view as shown by way of example in this figure. The location of the vehicle is shown using a vehicle icon 354. Each of the floors may be labelled with floor labels 356 (e.g. P1-P5). Furthermore, the map 350 may include other icons or symbols such as, for example, a car entrance symbol 358 to show the user where the entrance to the garage is situated. A pedestrian entrance icon 360 may be displayed on the map 350 to show where the pedestrian entrance is situated. Staircase icons 362 may be displayed to show where the staircase (or stairwell) is situated.

The mobile device and system disclosed in this specification also enable a novel method of obtaining map data in an underground or shielded environment such as for example an underground parking garage where GNSS (GPS) signals cannot be received with sufficient strength to obtain a position fix.

Figure 9:
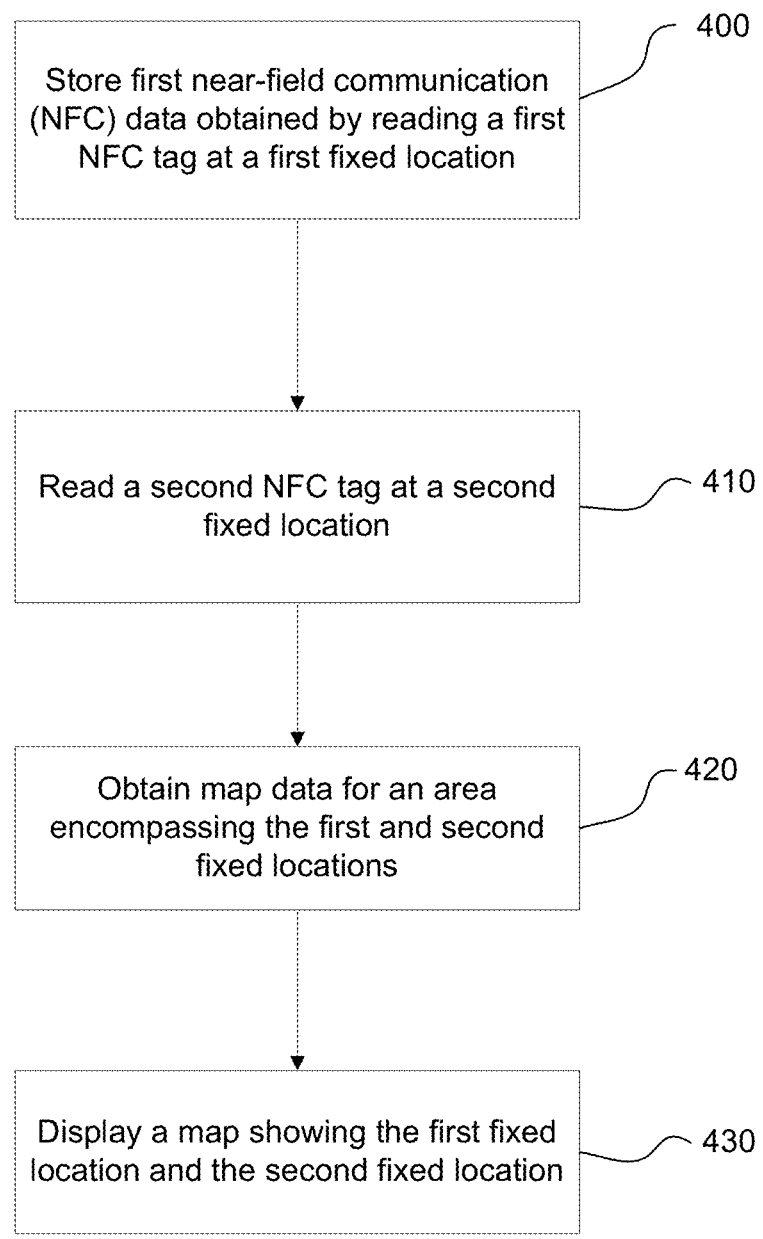
FIG. 9 is a flowchart of a method in accordance with one implementation of the present technology.

FIG. 9 is a flowchart of a method in accordance with one implementation of the present technology. As shown in FIG. 9, the method in broad terms entails providing location information in an underground or shielded environment by storing (400) first near-field communication (NFC) data obtained by reading a first NFC tag at a first fixed location (e.g. at or near the parking space), reading (410) a second NFC tag at a second fixed location (e.g. at a location on returning to the unfamiliar garage where the car was parked), obtaining (420) map data for an area encompassing the first and second fixed locations (e.g. by connecting to a map server via a locally situated or floor-specific wireless router), and (430) displaying a map showing the first fixed location and the second fixed location to aid the user in finding his or her car in the garage.

Figure 10:
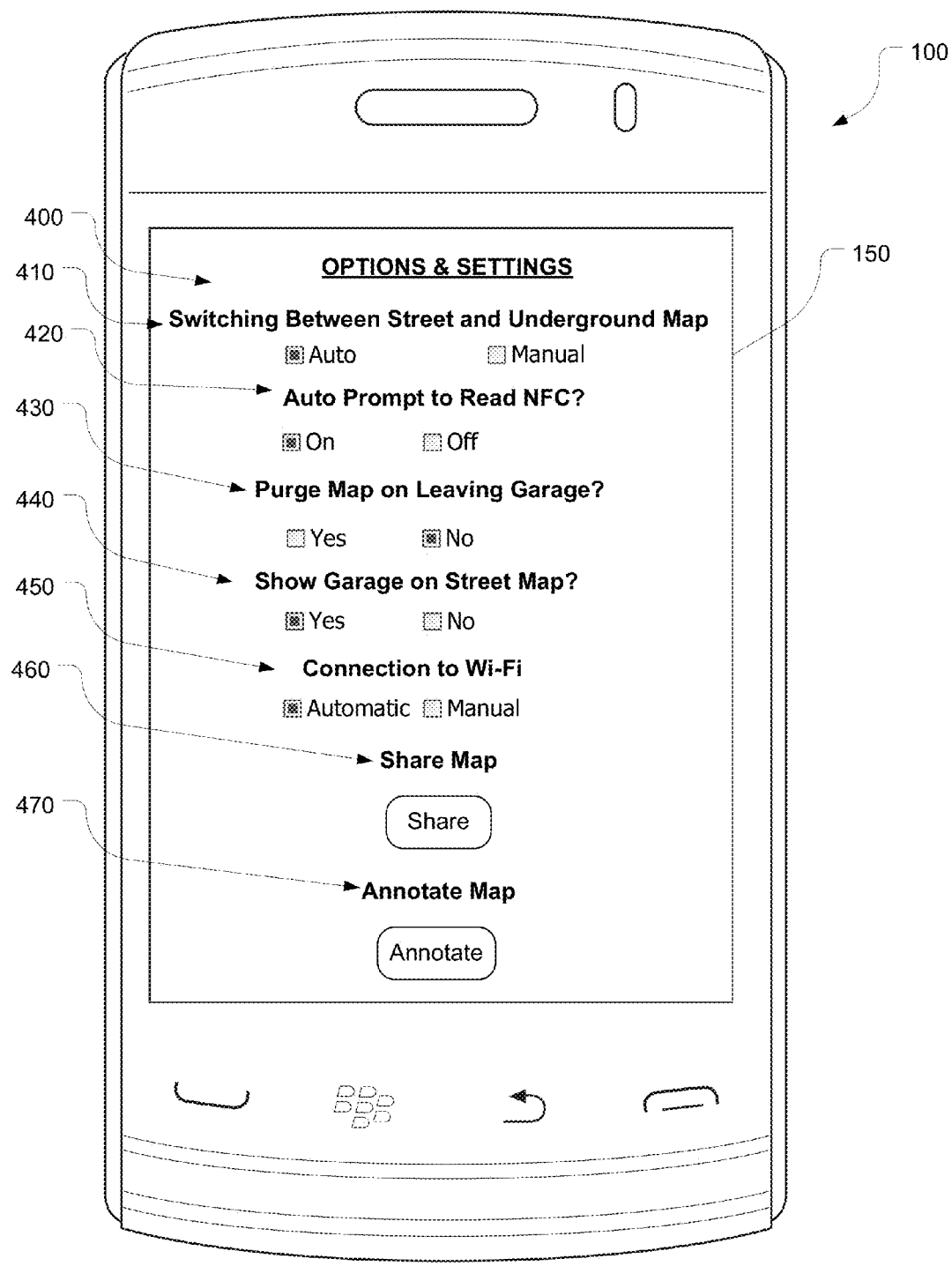
FIG. 10 depicts an options and settings page on a mobile device for configuring user settings.

The mobile device may be configured to provide different features or options. This may be done using an options and settings page on the device. FIG. 10 depicts an example of an options and settings page 400 on a mobile device that may be used to configure user settings and preferences or to enable or disable certain features. For example, as shown in FIG. 10, the options and settings page 400 may include an option 410 to switch either automatically or manually between street and underground map views. If the mobile device is configured to automatically switch between a street map and an underground garage map, then the device will switch automatically between these two map views in response to a detection event. The detection event may be the loss (or regaining) of a GNSS position fix. Otherwise, the mobile device may be manually switched between street and underground views in response to user input.

The options and settings page 400 may include an option 420 to automatically prompt the user to read an NFC tag. If the device is configured to auto prompt the user, then a visual and/or audible prompt will be output by the device on detecting that the user's vehicle has been parked in an underground garage. The prompt may be triggered by detection that the GNSS (GPS) signal has been lost and that the accelerometer reading has gone to zero (suggesting parking in an underground garage).

The options and settings page 400 may include an option 430 to purge map data on leaving the garage. The mobile device may be configured to either purge or retain the map data of the garage on leaving the garage. For privacy reasons, the user may prefer to always purge the map data. For convenience, the user may prefer to always retain the data.

The options and settings page 400 may include an option 440 to show the garage as an icon on the street map. Showing the garage icon on the street map (as depicted in FIG. 7 and FIG. 8) enables the user to see where the garage is situated on the street map and relative to the graphical current location indicator representing the current location of the mobile device.

The options and settings page 400 may include an option 450 to connect either automatically or manually to the local garage Wi-Fi™ router. If set to automatic connection, the mobile device connects automatically to the Wi-Fi™ router on receipt of login credentials (by reading the NFC tag) or by using credentials already stored in memory. Automatic connection thus requires no user input or user intervention. Manual connection, on the other hand, requires user input or user intervention. The user input may be a command to search for wireless networks and/or to connect to any identified wireless networks. Manual connection may also be a user response to a device prompt to connect.

The options and settings page 400 may include a user interface element 460 to share the map of the garage with other users. In response to a share command, the mobile device may enable the user to select recipients for receiving the map data via e-mail, MMS, to upload to a website or to transmit the data by other means. Sharing a map of the garage enables one user to share the location of a vehicle with another user. For example, it may be useful to share the location where one's vehicle is parked with a friend, family member, colleague, car pool member, etc.

The options and settings page 400 may include a user interface element 470 to annotate the map. In response to an annotate command, the mobile device may enable the user to annotate the map to put any special or customized information on the map. Annotations may include textual annotations, freehand drawings, highlighting, colouring, adding symbols, etc. For example, the user may annotate a map to write any useful information that the user may wish to remember such as the closing hours of the garage, the entrance that remain unlocked after normal business hours, where the pay station is located, how much the parking costs, etc.

This options and setting page 400 may be in any other form such as drop-down menus, check boxes, sliders, or other user interface elements.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method for providing location information, the method comprising:
    storing first near-field communication (NFC) data obtained by reading a first NFC tag at a first location;
    reading a second NFC tag at a second location wherein each NFC tag comprises login credentials for accessing a Wi-Fi router;
    obtaining map data, using data obtained from the first and second NFC tags, for an area encompassing the first and second locations by downloading the map data from a map server by connecting to the Wi-Fi router to access the map server; and
    displaying a map based on the map data showing the first location and the second location.

2. The method as claimed in claim 1 wherein each NFC tag on a floor of a multi-floor structure comprises login credentials for a floor-specific Wi-Fi router acting as a wireless access point for the floor.

3. The method as claimed in claim 1 wherein reading the first NFC tag and reading the second NFC tag comprise reading the first and second NFC tags that are affixed to structural columns in an underground parking garage.

4. The method as claimed in claim 1 wherein reading the first NFC tag and reading the second NFC tag comprise reading the first and second NFC tags that are disposed at each parking space in an underground parking garage.

5. A non-transitory computer-readable medium comprising instructions in code which when loaded into a memory and executed by a processor of a mobile device cause the mobile device to:
    store first near-field communication (NFC) data obtained by reading a first NFC tag at a first location;
    read a second NFC tag at a second location wherein each NFC tag comprises login credentials for accessing a Wi-Fi router;
    obtain map data, using data obtained from the first and second NFC tags, for an area encompassing the first and second locations by downloading the map data from a map server by connecting to the Wi-Fi router to access the map server; and
    display a map based on the map data showing the first location and the second location.

6. The computer-readable medium as claimed in claim 5 wherein each NFC tag on a floor of a multi-floor structure comprises login credentials for a floor-specific Wi-Fi router acting as a wireless access point for the floor.

7. The computer-readable medium as claimed in claim 5 wherein reading the first NFC tag and reading the second NFC tag comprise reading the first and second NFC tags that are affixed to structural columns in an underground parking garage.

8. The computer-readable medium as claimed in claim 5 wherein reading the first NFC tag and reading the second NFC tag comprise reading the first and second NFC tags that are disposed at each parking space in an underground parking garage.

9. A mobile device for providing location information, the mobile device comprising:
- a near-field communication (NFC) reader for reading a first NFC tag affixed to a first location and for reading a second NFC tag affixed to a second location;
- a processor coupled to the reader for determining first NFC tag data from the first NFC tag and for determining second NFC tag data from the second NFC tag, wherein the processor also determines login credentials from one or both of the first and second NFC tags;
- a memory for storing the first and second NFC tag data;
- a wireless transceiver for transmitting, in response to reading the second NFC tag data, the login credentials to a Wi-Fi router for accessing a map server, wherein the Wi-Fi router routes the first and second NFC tag data to the map server and for receiving map data for an area corresponding to the locations of the first and second NFC tags; and
- a display for displaying a map of the locations of the first and second NFC tags.

10. The mobile device as claimed in claim 9 comprising a digital camera for taking a photo of a parking sign, reading a QR code or barcode, and wherein the processor extracts location-identifying data from the sign, QR code or barcode and instructs the transceiver to send the location-identifying data to the map server.

11. The mobile device as claimed in claim 9 wherein the processor is configured to detect that a vehicle in which the mobile device has been travelling has been parked by monitoring accelerometer data of an accelerometer of the mobile device and wherein the processor is configured to generate a prompt to remind a user to read a nearby NFC tag to store the location of the vehicle.

12. The mobile device as claimed in claim 9 wherein the processor is coupled to a GPS receiver and is configured to automatically store GPS coordinates of a garage or shielded environment when the processor detects that the mobile device has emerged from the garage or shielded environment and wherein the processor is configured to obtain a GPS position to store the location of the garage.

13. The mobile device as claimed in claim 12 wherein the display is capable of displaying different map views and the processor is configured to automatically switch from a street map view to an underground garage map view when detecting that the mobile device has re-entered the garage and has lost the GPS position fix.

14. The mobile device as claimed in claim 13 wherein the processor is configured to predict entry into an underground garage, and to pre-emptively download a map of the underground garage.

* * * * *